Figure 1:
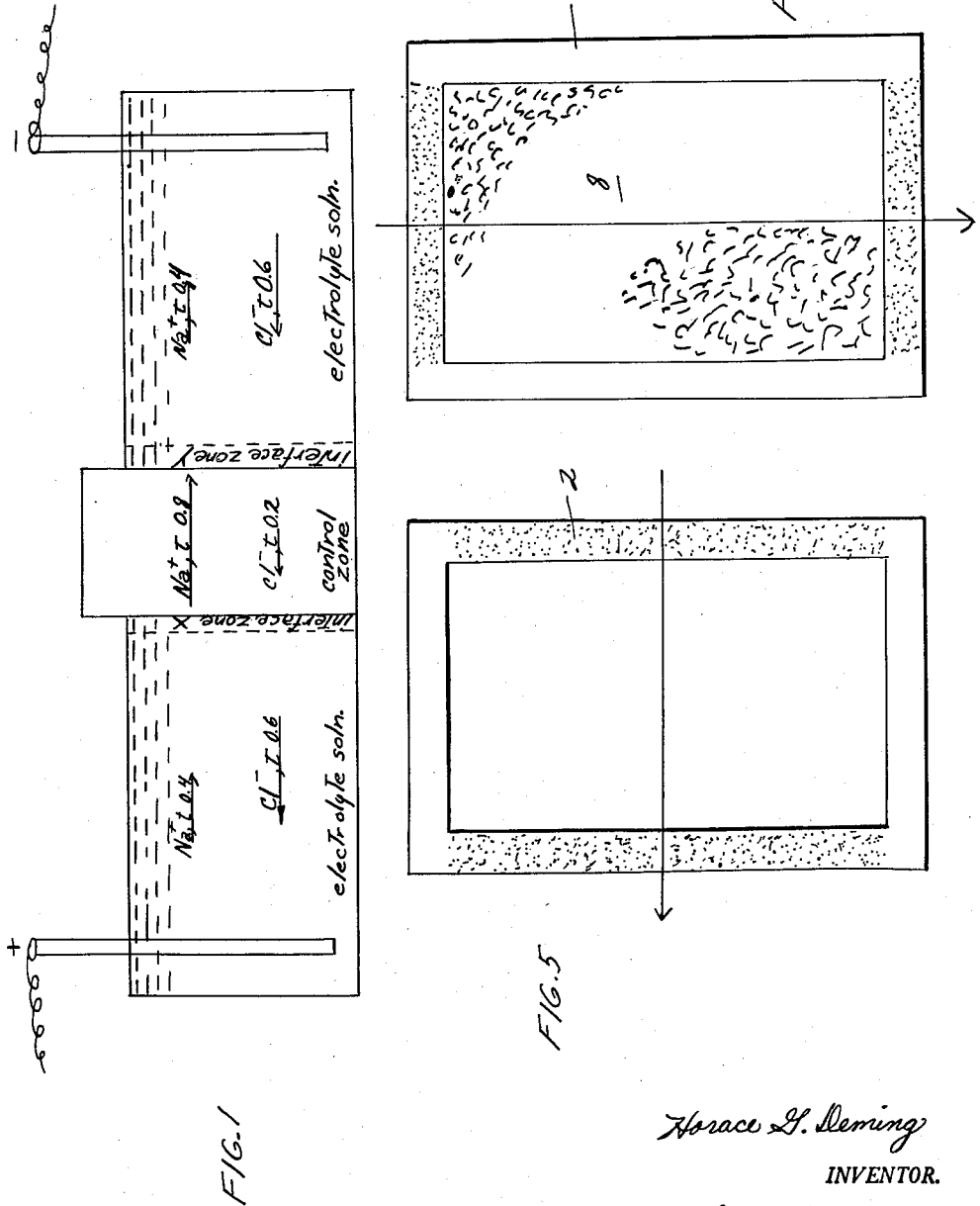

United States Patent Office 2,923,676
Patented Feb. 2, 1960

2,923,676

METHOD AND CELL FOR ALTERING THE CONCENTRATION OF DISSOLVED IONIC SUBSTANCES

Horace Grove Deming, Sarasota, Fla.

Application May 31, 1956, Serial No. 588,365

3 Claims. (Cl. 204—301)

The present invention relates generally to the alteration of the concentration of electrically charged particles in solution. More specifically, the present invention is concerned with a method and apparatus for treating a solution of charged particles so as to transfer the particles from one portion of the solution to another portion thereof, or from one solution to another, whereby the concentration of particles in one is depleted, and the concentration in the other is increased.

Some of the more recent efforts to effect a transfer of electrolytes in solution are exemplified by the U.S. patents to W. Juda and W. A. McRae 2,636,852, W. E. Katz and N. W. Rosenberg 2,708,680, and N. W. Rosenberger 2,708,658. According to the prior art, as exemplified by the foregoing patents, the ions of an aqueous electrolyte solution are transferred to deplete the ion concentration in one portion of a solution and enrich the ion concentration in another portion of the solution, by dividing a cell containing the solution into three parts utilizing two selective ion-permeable exchange membranes of different character. One of these membranes is cation permeable and the other anion permeable. By applying a direct current across this cell, the anions and cations are transferred out of the central compartment between the two membranes, through the respective selective membranes. In this manner the central compartment is depleted of ions, while the outside adjacent compartments may be enriched in ions when a series of such membranes is appropriately arranged. It is characteristic of the prior art, and in accordance with its teachings, to require that the portion of the solution to be depleted be bounded on the cathode side of the cell by a cation permeable selective membrane, and on the anode side by an anion permeable selective membrane. The use of both cation selective and anion selective membranes has been considered essential by this prior art in order to obtain an ion depletion by such transference.

In accordance wtih the present invention, however, I have found that in a solution containing charged particles, the concentration of one portion of the solution may be depleted while another portion may be enriched, while utilizing only one type of selective ion permeable membrane, either anion selective or cation selective. And further, I have found that the foregoing effects are not limited to the use of an ion selective membrane. By use of an appropriately constructed cell, the foregoing effects can be obtained by the use of any membrane, layer, barrier, partition, or zone, either solid or liquid, wherein the transport numbers of the ions concerned are different from their transport numbers in the mother solution being treated. For the purposes of the present description and claims, said membrane, layer, barrier, partition, or zone, whether of the ion selective type or of any other nature, will be herein termed a "control" and by this term it is intended to embrace all forms and means whereby the transport numbers of the ions are altered with respect to their transport numbers otherwise existing in the mother solution.

Considering the nature of the present invention from another standpoint, I have found that by properly constructing or operating a cell based upon a single control approach (as distinguished from the above-described two control types of cells of the prior art), the ion concentration of one electrolyte solution can be depleted and that of another electrolyte solution enriched in the same cell, and the practical effects thereof be achieved.

The present invention is predicated upon the fact that if a direct current is applied across a cell containing an electrolyte or like solution, and a zone is provided in said cell to be traversed by the current carrying particles wherein the transport numbers of the electrolyte ions are for any reason different from those in the remainder of the cell, at one interface between said zone and the remainder of the solution there results a depletion or lower concentration of ions than in the remainder of the cell, and at the other interface between said zone and the remainder of the solution there results a corresponding enrichment or higher concentration of ions than in the remainder of the cell. By the present invention, this phenomenon is employed to effect a transfer of electrolytes in solution, and to achieve on the one hand a depletion of ion concentration within a solution, with enrichment of another solution on the other hand.

It is accordingly one object of the present invention to provide for the transfer of electrolytes between solutions, or between portions of the same solution.

Another object of the present invention is to provide for the transfer of electrolytes between solutions or portions of the same solution, depleting the electrolyte concentration of one solution or portion and enriching the concentration of another.

Another object of the present invention is to provide for the preferential transfer of current carrying electrolyte particles from a first solution to a second or from a first portion of a solution to another portion thereof, by the use of a control in a cell wherein the transport numbers of the electrolyte particles are different in said control than in other portions of the cell.

Another object of the present invention is to provide for the preferential transfer of current carrying electrolyte particles from a first solution to a second, or from a first portion of a solution to another portion thereof, by utilizing the concentration changes present at the interfaces of a control interposed in the electrolyte solution.

Still another object of the present invention is to provide for the transfer of current carrying electrically charged particles in solution, so as to effect within a cell a depletion of particle concentration in one solution and enrichment of particle concentration in another solution, or a depletion in one portion of the solution and enrichment in another portion thereof, with the use of but a single type of control in the cell.

Figure 2:
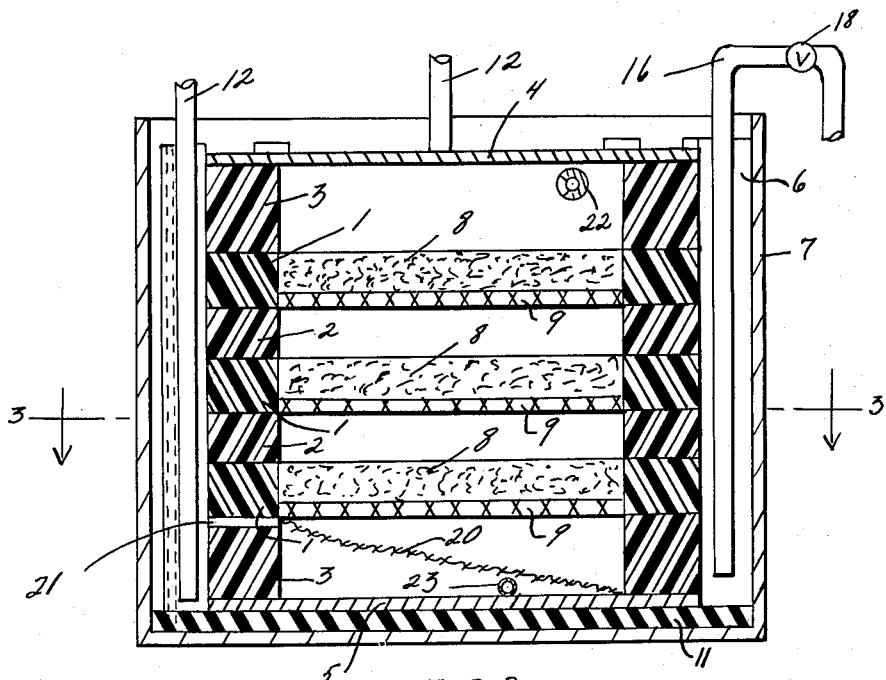
Figure 3:
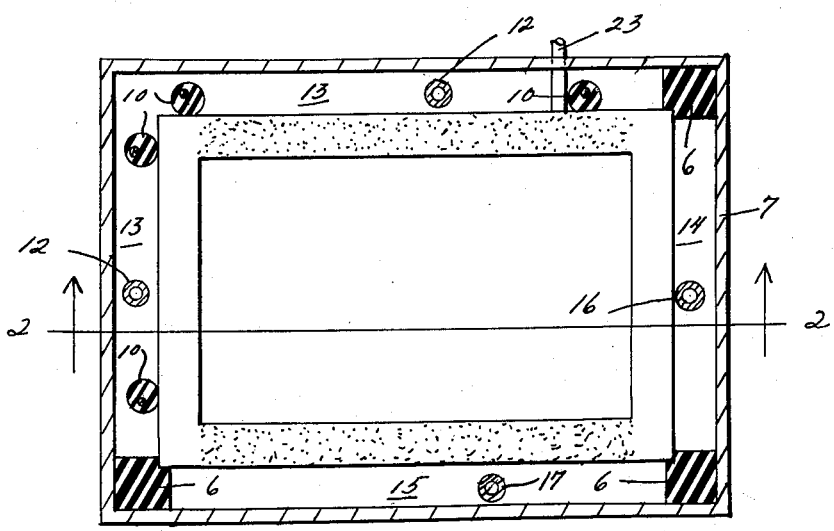

Other objects and advantages of the present invention will become apparent to those skilled in the art from a consideration of the following detailed description of the present invention, had in conjunction with the accompanying drawings, wherein:

Fig. 1 schematically depicts a cell illustrative of the principle of the present invention; and Fig. 2 is a vertical section through a cell adapted to function in accordance with the principle illustrated in Fig. 1 and representing a preferred embodiment of the present invention, taken along line 2—2 of Fig. 3; and Fig. 3 is a cross-section taken along the line 3—3 of Fig. 2; and Figs. 4 and 5 are face views of two separator sheets employed in the instant cell.

The present invention is predicated upon the basic observation: If a direct electric current is applied across an electrolyte solution, and a control is interposed between the electrodes in the path of migration of the current-carrying ions, the control being defined as a zone wherein the transport numbers of the electrolyte particles are different from those of the electrolyte particles in the solution per se, there results a depletion of electrolyte at one control-solution interface, and an enrichment of electrolyte at the other control-solution interface. The foregoing proposition may be illustrated by reference to the schematic cell of Fig. 1. The cell is depicted as containing an aqueous solution of sodium chloride as the electrolyte, an anode at one end and a cathode at the other, with an ion permeable control as above defined interposed between the electrodes. For the purpose of illustration, it is assumed that the transport number $t$ for the sodium ions is 0.4 in the aqueous electrolyte, and $t$ is 0.6 for the chloride ions; while in the control $t$ for the sodium ions is 0.8, and for the chloride ions $t$ is 0.2. These transport numbers, also called transference numbers, represent the fractional part of one equivalent of each particular ion that is brought up to a given point by the passage of one faraday of electricity through the cell. Therefore, as the sodium ions migrate toward the cathode and the chloride ions migrate toward the anode, at interface zone $x$ the sodium ions enter the control at a greater frequency than they arrive at the interface from the surrounding electrolyte solution, and similarly the chloride ions leave the interface zone $x$ at a greater frequency than they arrived from the control; while similarly the sodium and chloride ions arrive at the interface $y$ at a greater frequency than they depart therefrom, in their respective migrations toward the cathode and anode. In other words, the transport of sodium ions from interface $x$ to interface $y$ is greater than their transport through the electrolyte solution, and the transport of chloride ions through the control is less than through the electrolyte. From the foregoing, it becomes apparent that the electrolyte concentration at interface zone $x$ is depleted, while that at interface zone $y$ is enriched. These interface films or zones thus furnish the means for separating an electrolytic solution into enriched and depleted portions. Multiple zones of solution enrichment and depletion may of course be obtained by the use of multiple spaced controls along the cell in the path of ion migration between the electrodes.

Although it is easy to produce films or layers of decreased or increased concentration, in the manner just described, it is not so easy to isolate these and withdraw them separately from the cell. The effect of the electric current tends to be diminished by four other processes:

(1) Turbulent flow, by which enriched and depleted solutions are intermingled mechanically, enrichment to that extent cancelling depletion.

(2) Circulation caused by differences in density. This has the same effect as turbulent flow.

(3) Losses due to failure to obtain a rate of flow of solution through the cell that is properly proportioned to the current in amperes. If the solution flows too rapidly the enriched and depleted portions pass from the cell in admixture with solution of unaltered concentration. The changes in concentration are then less than those possible. If the solution, on the contrary, flows too slowly, the enriched and depleted zones grow in thickness until in a multi-control cell they meet. They are then in a steady state with respect to each other and the controls. Depletion thereafter is cancelled by enrichment brought in from the adjoining enriched zone, and further passage of the current accomplishes nothing. It can be shown that the proper rate of flow of the solution through the cell is such that one equivalent of ionic material (in the enriched and depleted films) traverses the two surfaces of each control for each faraday of electricity that is passed through the cell.

(4) The diffusion of ions from the enriched into the adjoining depleted zones.

It might be supposed that the first two of these four unwanted processes could be overcome by membranes of parchment paper or similar ion-permeable material, separating the enriched from the depleted regions. However, turbulent flow and circulation caused by difference in density would even then carry the enriched and depleted portions of the liquid as far as the membranes. The electric current would then carry them through the membranes, diminishing the effectiveness of the membrane.

An appropriate means for preventing turbulent flow and circulation caused by differences in density is to arrange for a slow linear rate of flow and to use controls that are horizontal or nearly so, with an electric current passed through the apparatus in such a direction that each depleted (low density) zone lies above the adjacent enriched (high density) zone. The adjustment of current strength to rate of input of dissolved ionic impurities may be made continuous and automatic by a vacuum-tube control in which changes in concentration (solution flowing at a steady rate) are reflected in proportionate changes in the strength of the electric current through the apparatus. Diffusion of ions from the enriched into the adjoining depleted regions may be decreased (though at extra expense for energy, due to increased electrical resistance) by spacing multiple controls farther apart.

There is one other condition for optimum effective separation of solution films that have been respectively enriched and depleted: that all parts of the films that traverse the surfaces of the controls spend equal times in contact with these surfaces (assuming that the electric current through each control is uniformly distributed). For, obviously, swift flowing parts of any film will reach the outlet before they are properly enriched or depleted; and slow-flowing parts will increase in thickness until they meet a film of opposite character, depletion thereafter cancelling enrichment at the surface of contact.

The requirement of equal contact times in practice amounts to equal lengths of path in traversing the surface of the control. It is therefore preferred that all portions of the films traverse equal distances in contact with the surfaces of the controls, in flowing from inlets to outlets. An example would be a square or rectangular control, with inlet and outlet that extend the whole length of opposite sides; or a circular control supplied along its entire outer margin with solution that flows toward an outlet of limited area, near its center. It can be shown that the enriched and depleted solutions are then discharged in their entirety from the outlets, without admixture with each other or with untreated solution, and with no loss in enrichment or depletion other than that inevitably caused by diffusion.

The preceding requirements are embodied in the preferred form of a cell for practicing the present invention, shown in Figs. 2–5. The cell there shown comprises an indefinite odd number of stiff, water-resistant sheets 1, 2, 3 of a dimensionally stable plastic, for example, preferably rectangular and horizontal, interposed between an upper electrode 4 and a lower electrode 5, and separated by vertical gaskets 6 from two adjacent vertical walls of a box or container 7. The sheets 3 that are adjacent to the electrodes and the alternate intervening sheets 2 serve merely to separate the electrodes and the remaining sheets 1, which carry the controls 8.

Most of the area of each sheet is cut away in a rectangular opening, to permit the passage of a direct electric current between the electrodes. These openings, in the case of the separator sheets 2, 3 contain the solution to be treated, and in the case of the control sheets 1 contain a layer of control material, of a character already described, either as a continuous layer, or as a layer of compacted flakes, filaments or granules, or even a layer of liquid colloidal dispersion, retained between sheets or within a bag of colloid-impermeable material, such as cellophane that has been swollen with a strong solution of zinc chloride. Since the control material usually has only slight mechanical strength, it is supported by grids or screens 9, of such a material as Fiberglas.

In Figs. 4, 5, certain areas of the sheets 1, 2 are stippled. Within the stippled areas the upper surface of each separator sheet 2 and the lower surface of each control sheet 1 is slightly roughened, while the unstippled areas are left smooth. Appropriate parts of the remaining surfaces, namely the lower surface of each separator sheet 2 and the upper surface of each control sheet 1 are treated in the opposite manner, namely are left smooth in the stippled areas and roughened in appropriate parts of the remaining areas. Thus when the sheets are stacked as shown in Fig. 2, roughened areas are face to face and smooth areas face to face. The smooth areas may also be given a flexible waterproof coating, of such a material as a rubberized paint, to prevent the flow of solution over these areas, when the stacked sheets are loosely weighted or pressed together, although the solution still passes over the roughened areas. By this device it is contrived that adjacent films of solution which pass between the roughened areas of the sheets 1, 2 and which then are caused to traverse respectively the upper and lower surfaces of the controls shall flow in a horizontal plane at right angles to each other, as indicated by arrows traversing Figs. 4 and 5 representing the upper surfaces of the respective sheets 1, 2.

Vertical spindles 10, supported in holes in the baseplate 11, and rotatable eccentrically, permit the stacked sheets 1, 2, 3 to be firmly pressed against the gaskets 6, the gaskets then serving as water-tight barriers between the compartments 13, 14, and 15. The solution to be treated enters the assembly through the inlet tubes 12, and fills the compartment 13 between two edges of rectangular sheets 1, 2, 3 and two adjacent walls of the surrounding container 7. It thence passes between each pair of adjacent sheets 1, 2, over the stippled (roughened) areas, and flows in thin films, directed at right angles to each other, over the upper and lower surfaces of each control 8. Here it is enriched in one film and depleted in the adjacent film, according to the nature of the controls and the direction of the current.

As already explained, the direction of the current is preferably such that the film of solution flowing over the upper surface of each control 8 is enriched, whereas the adjacent film, flowing at right angles thereto over the lower surface of each control, is depleted. The enriched and depleted solutions, passing out between the horizontal sheets 1, 2, in the directions shown by the arrows in Figs. 4 and 5, enter narrow spaces or compartments 14, 15 that are separated from each other and from the space 13 by the gaskets 6. The enriched solution collects in the compartment 14 and the depleted solution in the compartment 15. The solutions are thence removed through the siphons 16, 17 and the valve 18 and a similar valve (not shown) in siphon 17 at rates determined by the transport number of the principal ions. It is helpful to have the dimensions of the control areas in the same ratio as these transport numbers. Thus a control surface whose sides are in the ratio 2:3 will pass enriched and depleted solutions in this ratio, if the surfaces that are stippled in the diagram are equally roughened.

An inclined screen or ion-permeable membrane 20, of such a material as Fiberglas or fabric, deflects gas escaping from the lower electrode 5 (normally of graphite) through the vent 21. The upper electrode 4 (of stainless steel, for example) may be an open-mesh screen, to permit the escape of gas. Since films of solution that have transversed the surfaces of the electrodes are acid at the anode and alkaline at the cathode, they are separately removed from the apparatus through slotted tubes 22, 23 for the upper and lower electrodes, respectively. The rate of flow of the solution through the apparatus should preferably be such that one equivalent of ionic material (in two films) traverses the surfaces of the electrodes and one equivalent (in two films) traverses the upper and lower surfaces of each control, for each faraday of electricity that is passed.

It is understood that the cell of Figs. 2 and 3 may be designed in many forms and embodiments to exploit the principles of the cell described with relation to Fig. 1. And with respect to any embodiment chosen, it is understood that the cell may be used as a single pass system, or a plurality of similar cells may be placed in series with respect to electrolyte flow for single pass operation, or a cell or series of cells may be used in a single batch electrolyte recirculation system, where a selected batch of electrolyte is recirculated through the system until a desired depletion and/or enrichment is obtained. The choice of mode of operation will depend principally on the parameters imposed upon the system and the extent of enrichment and/or depletion desired.

For the purposes of the present invention, the controls may be any material or combination of materials, or may comprise any means, which within a defined zone or zones will provide different transport numbers from those in the original solution, for the electrolyte ions whose concentration it is desired to alter. The controls may comprise an ion exchange resin, either of the cation permeable type or the anion permeable type. In using such material, in view of the above discussed principles of operation, it is apparent that the control zones need not be totally selective with respect to the type of ion passed by the control, although it may be so selective if desired. Other principles may be employed to provide the sole essential characteristic of the control: that the transport numbers of the ions present be different in the control than in the solution being treated. For example, the transport numbers of ions can be changed by altered temperature, by electrostatic charges on porous conductive barriers and by utilizing a different ion conducting medium within the controls than in the solution being treated. By these and other modes of affecting the transport numbers of the current carrying particles the principles of the present invention may be practiced.

An important case is when the control material bears an electric charge, due to its chemical nature, and when the pores that traverse it are of very limited cross-section, as in jellies. In representative experiments with aqueous sodium chloride solution, using a cell with two like controls, I have found enriched and depleted concentrations corresponding to the following values for the transport number of sodium ion, within the controls:

Amberplex $C_1$ in continuous sheets_____ 0.94
Amberplex $C_1$ in compacted flakes, cemented with formaldehyde-hardened gelatin_____ 0.90
Amberlite IR-120, in a layer of compacted granules, 2 mm. thick_____ 0.85
Sodium oleate, a 5% liquid colloidal dispersion, in a cellophane bag that has been made colloid-impermeable by being swollen in a 40% solution of zinc chloride_____ 0.45
Ferric hydroxide precipitate_____ 0.36
Amberplex $A_1$ in continuous sheets_____ 0.07

The relative effectiveness of any control material may be found by subtracting the transport number of the sodium ion, within it, from 0.4 (the transport number of sodium ion in an aqueous solution). This difference is positive when the control material is positively charged and indeed whenever the passage of sodium ions through the control is for any reason impeded. The difference is negative in the opposite case.

The extent of ion enrichment and depletion obtained from a given cell operation is a function of many factors in the cell construction and operation as set forth hereinafter. The enriched and depleted electrolyte concentrations are to the original electrolyte concentration in the respective enrichment and depletion zones as the transport numbers in the control and the aqueous or original solution zone of the ion which passes from the control into the aqueous zone at that particular interface. Expressed mathematically, for the instance where control and aqueous zone transport numbers are such that it is the cation which enters the aqueous zone from the control at an enrichment interface (zone $y$ in Fig. 1 for a cation or negatively charged exchanger type of control):

$$c' = c_o' \frac{t_C^+}{t_A^+}$$

for enrichment, and $$c'' = c_o'' \frac{t_C^-}{t_A^-}$$

for depletion, where $c$ is concentration in equivalents per liter
$t$ is the transport number ($t^+$ for cation; $t^-$ for anion)
C subscript denotes control zone
A subscript denotes aqueous zone
$o$ subscript denotes original concentration
$'$ denotes solution being enriched
$''$ denotes solution being depleted If the rate of flow of electrolyte for depletion and enrichment solutions is adjusted respectively to $$\frac{t_A^-}{c_o''} \text{ and } \frac{t_A^+}{c_o'}$$

liters for each faraday of electricity passed, the cell has $n$ control zones traversed by the electrolyte stream as in Fig. 2, and $t_A^+$ is 0.4 and $t_A^-$ is 0.6, a flow of $i$ amperes during one hour produces $0.0224\ in/c_o''$ liters of depleted solution, and $0.0149\ in/c_o'$ liters of enriched solution. And for each faraday of electricity passed, the number of equivalents of electrolyte enrichment and depletion for each control is $t_C^+ - t_A^+$. The foregoing is illustrative of an instance where $t_C^+$ is greater than $t_A^+$, and the relationship for an instance where $t_C^+$ is less than $t_A^+$ is apparent therefrom.

It will thus be seen that in accordance with the present invention there is provided a method and means for transferring an electrolyte from one solution to another, by the use of one or more controls interposed in the path of ion travel between the two electrodes of the cell. The cell depends for its operation upon but a single control or a single type of control, which may be an ion selective permeable membrane, or of any other character which will permit the transfer of electrolyte therethrough with transfer numbers different from those in the original or mother solution. As a result of the difference in transfer numbers, one control-mother solution interface will be depleted in electrolyte concentration, while the other interface will be enriched. To take practical advantage of the changes in concentration at these interfaces, an electrolyte solution to be enriched and one to be depleted are flowed at appropriate rates and under proper conditions through these interface zones to effect the desired transfer of ions. The present invention is basically distinguished from prior attempts at analogous cataphoretic ion transfer between solutions by requiring in each cell only one type of control and relying for basic operation upon but a single such control. This is, whereas prior workers in this field have found it necessary to bound the solution to be depleted of ions with a cation selective membrane on one electrode side of the cell and an anion selective membrane on the other electrode side of the cell; by the present invention only one such type of membrane is used for the control either cation selective or anion selective. Additionally, it is found that the control of the present cell need not be completely ion selective in the sense of an ion exchange material, but need merely alter the transfer numbers of ions from those existing in the mother solution to be treated, and may readily pass ions of both signs. It will thus be seen that the present invention affords a substantial simplification over prior art approaches, and embodies a substantial departure from the rationale of prior work in this field.

Many forms of the cell embodying the concepts of the present invention will be apparent to those skilled in the art, and it is therefore not intended to restrict the scope of the present invention to any specific form of cell which may be particularly suggested by the foregoing description. Accordingly, all modifications and embodiments of the present invention as are embraced by the spirit and scope of the appended claims are contemplated as within the purview of the present invention.

I claim:

1. An electrolytic cell adapted to contain an electrolyte solution comprising two electrodes, one adapted to function as an anode and the other adapted to function as a cathode, a liquid flow partition in said cell interposed between said electrodes forming two compartments, one to either side of said partition, one surface of said partition facing toward one electrode and the other surface of said partition facing towards the other electrode, said partition being characterized by providing a different transport number for the ions of the electrolyte solution than is had in the electrolyte solution, means for directing a flow of electrolyte solution into only a portion of one of said compartments and in immediate contact with and along a first surface of said partition, means for extracting a flow of electrolyte solution from only said portion of the last mentioned compartment and in immediate contact with and from along the last mentioned surface, means for directing a flow of electrolyte solution into only a portion of the other of said compartments and in immediate contact with and along the second surface of said partition, and means for extracting a flow of the electrolyte solution from only the last mentioned portion of the last mentioned compartment and in immediate contact with and from along the last mentioned surface, whereby, when the cell is electrolyzed, the ion concentration in one of said flows is depleted while that in the other of said flows is enriched.

2. An electrolytic cell adapted to contain an electrolyte solution, comprising two electrodes, one adapted to function as an anode and the other adapted to function as a cathode, two liquid flow partitions in said cell interposed between said electrodes forming in said cell a central compartment between said partitions and two end compartments on opposite sides of the pair of partitions, one surface of each of said partitions facing toward one electrode and the other surface of each of said partitions facing toward the other electrode, said partitions both being characterized by providing a different transport number for the ions of the electrolyte solution than is had in the electrolyte solution, first means for directing a first flow of electrolyte solution into only a first portion of said central compartment and in immediate contact with and along a first surface of a first of said partitions, second means for extracting a flow of electrolyte solution from only said first portion of said central compartment and in immediate contact with and from along the last mentioned surface, third means for directing a second flow of electrolyte solution into only a second portion of said central compartment and in immediate contact with and along a first surface of the second of said partitions, fourth means for extracting a flow of electrolyte solution from only said second portion of said central compartment and in immediate contact with and from along the last mentioned surface, further means for directing an additional flow of electrolyte solution into only a portion of each of said end compartments and in immediate contact with and along the respective second surfaces of said partitions, and for extracting a flow of electrolyte solution from only said portion of each of said end compartments and in immediate contact with and from along said respective second surfaces, whereby, when the cell is electrolyzed, the ion concentration in one of said flows in said central compartment is depleted while that in the other of said flows in said central compartment is enriched, and that in said flow in said end compartment adjacent said enriched central compartment flow is depleted, while that in said flow in the opposite end compartment is enriched.

3. An electrolytic cell as set forth in claim 2, wherein the two partitions are disposed vertically one above the other, said first and second means form inlet and outlet ports on substantially the same horizontal plane into the central compartment immediately adjacent the first surface of the first partition, said third and fourth means form inlet and outlet ports on substantially the same horizontal plane into the central compartment immediately adjacent the first surface of the second partition, said first mentioned ports being spaced vertically from said second mentioned ports, said further means form inlet and outlet ports on substantially the same horizontal plane into one end compartment immediately adjacent the second surface of the first partition and inlet and outlet ports on substantially the same horizontal plane into the other end compartment immediately adjacent the second surface of the second partition.

References Cited in the file of this patent

UNITED STATES PATENTS

| | | |
|---|---|---|
| 2,636,852 | Juda et al. | Apr. 28, 1953 |
| 2,694,680 | Katz et al. | Nov. 16, 1954 |
| 2,708,658 | Rosenberg | May 17, 1955 |
| 2,741,591 | Dewey et al. | Apr. 10, 1956 |
| 2,784,158 | Bodamer | Mar. 5, 1957 |
| 2,815,320 | Kollsman | Dec. 3, 1957 |

FOREIGN PATENTS

| | | |
|---|---|---|
| 14,195 | Great Britain | 1903 |
| 675,253 | Great Britain | July 9, 1952 |
| 716,875 | Great Britain | Oct. 13, 1954 |
| 733,234 | Great Britain | July 6, 1955 |
| 512,273 | Canada | Apr. 26, 1955 |
| 26,821 | Norway | Apr. 3, 1916 |
| 1,068,504 | France | Feb. 3, 1954 |

OTHER REFERENCES

Winger et al.: J. Electro. Chem., vol. 100, No. 4, pp. 178–204.

Walters et. al.; Ind. and Eng. Chem., vol. 47, No. 1, January 1955, pp. 61–66.

Murphy: J. Electro. Chem. Soc., vol. 99, No. 12, pp. 520–526.